(12) United States Patent
Miller

(10) Patent No.: US 11,661,753 B2
(45) Date of Patent: May 30, 2023

(54) BOARD MANIPULATION DEVICE

(71) Applicant: Joseph John Miller, Dresden, OH (US)

(72) Inventor: Joseph John Miller, Dresden, OH (US)

( * ) Notice: Subject to any disclaimer, the term of this patent is extended or adjusted under 35 U.S.C. 154(b) by 778 days.

(21) Appl. No.: 16/278,422

(22) Filed: Feb. 18, 2019

(65) Prior Publication Data

US 2020/0263441 A1    Aug. 20, 2020

(51) Int. Cl.
  *E04F 21/22*  (2006.01)
  *B23Q 9/00*   (2006.01)

(52) U.S. Cl.
  CPC ............ *E04F 21/22* (2013.01); *B23Q 9/0078* (2013.01)

(58) Field of Classification Search
  CPC ........ E04F 21/22; B25B 5/068; B23Q 9/0078
  See application file for complete search history.

(56) References Cited

U.S. PATENT DOCUMENTS

| | | |
|---|---|---|
| X822093 | 5/1906 | Jack |
| 822,093 A * | 5/1906 | Hopkins ................. E04F 21/22 254/14 |
| 1,475,851 A | 11/1923 | Morgan |
| 2,774,969 A | 12/1956 | Samples |
| 5,527,014 A | 6/1996 | Bracewell |
| 5,533,709 A * | 7/1996 | Tarbell ...................... B66F 3/08 254/13 |
| 6,616,132 B1 | 9/2003 | Ellison |
| 7,044,460 B2 | 5/2006 | Bolton |
| 7,913,976 B2 | 3/2011 | Gaunt |
| 8,397,471 B2 | 3/2013 | Jones |
| 9,127,466 B2 * | 9/2015 | Hinkle .................... E04F 21/20 |
| 2004/0211152 A1 * | 10/2004 | Aaberg ................... E04F 21/22 52/747.1 |
| 2006/0278046 A1 | 12/2006 | Gargano |
| 2010/0083610 A1 | 4/2010 | King |
| 2018/0141134 A1 * | 5/2018 | Brigham ................. B23B 47/28 |

FOREIGN PATENT DOCUMENTS

| | | | | |
|---|---|---|---|---|
| CA | 2481748 C | * | 6/2009 | ........ E04F 15/02183 |
| CA | 2680990 A1 | * | 4/2010 | ........... B25B 23/005 |
| CA | 2690692 A1 | * | 7/2010 | ............. E04F 21/22 |

* cited by examiner

*Primary Examiner* — Babajide A Demuren
(74) *Attorney, Agent, or Firm* — Thomas Y. Kendrick; Benjamen E. Kern; Kern Kendrick LLC

(57) ABSTRACT

A device for manipulating a board is provided, the device comprising: a body having an upper side and a lower side; the body having a proximal end comprising an angled face, wherein the angled face is formed on the upper side, and wherein the angled face includes an aperture extending into the angled face and through the body; the body having a distal end including a U-shaped board engagement member including a pair of legs; and the body having at least one joist alignment member extending downwardly from the lower side.

7 Claims, 13 Drawing Sheets

BOARD MANIPULATION DEVICE

BACKGROUND

Materials for use in the construction of structures are often warped in a manner that makes those materials difficult or even impossible to use for the intended purpose. For example, wooden, polymer, or composite boards used for decking or flooring may be bowed, crooked, kinked, cupped, or twisted. Carpenters often need to straighten these boards during the installation of the boards to maintain an even construction or improve the appearance of the structure. Alternatively, on occasion a structure may require boards to be intentionally bent in a controlled manner to achieve the desired construction or appearance.

The inherent rigidity of wood, polymer, or composite boards make physically bending them into a desired position difficult without the use of a tool. What is needed is a device for the manipulation of boards into a desired position that can be easily used during construction of a structure.

SUMMARY

In one embodiment, a device for manipulating a board is provided, the device comprising: a body having an upper side and a lower side; the body having a proximal end comprising an angled face, wherein the angled face is formed on the upper side, and wherein the angled face includes an aperture extending in an inclined direction orthogonal to the angled face and through the body; the body having a distal end including a U-shaped board engagement member including a pair of legs; and the body having a pair of removable joist alignment members extending downwardly from the lower side.

In another embodiment, a device for manipulating a board is provided, the device comprising: a body having an upper side and a lower side; the body having a proximal end comprising two angled faces, wherein a first angled face is formed on the upper side, wherein a second angled face is formed on the lower side, and wherein the first angled face and the second angled face each include an aperture extending in an inclined direction orthogonal to the angled face and through the body; the body having a distal end including a U-shaped board engagement member including a pair of legs; and the body having a pair of joist alignment members extending downwardly from the lower side.

In one embodiment, a method for manipulating a board is provided, the method comprising: providing a device for manipulating a board, comprising: a body having an upper side and a lower side; the body having a proximal end comprising an angled face, wherein the angled face is formed on the upper side, and wherein the angled face includes an aperture extending in an inclined direction orthogonal to the angled face and through the body; the body having a distal end including a U-shaped board engagement member including a pair of legs; and the body having a pair of removable joist alignment members extending downwardly from the lower side; orienting the device upon a joist, such that the lower side of the body contacts the joist, and such that the pair of alignment members are oriented on a first side of the joist and a second side of the joist; placing the U-shaped board engagement member into contact with a board oriented on an upper side of the joist; placing a threaded fastener into the aperture of the angled face; and applying a torque to the threaded fastener, causing the threaded fastener to engage the joist through the aperture and exert a force onto the angled face, resulting into a force being applied through the board engagement member and into the board.

In another embodiment, a method for manipulating a board is provided, the method comprising: providing a device for manipulating a board, comprising: a body having an upper side and a lower side; the body having a proximal end comprising two angled faces, wherein a first angled face is formed on the upper side, wherein a second angled face is formed on the lower side, and wherein the first angled face and the second angled face each include an aperture extending in an inclined direction orthogonal to the angled face and through the body; the body having a distal end including a U-shaped board engagement member including a pair of legs; and the body having a pair of joist alignment members extending downwardly from the lower side; orienting the device upon a joist, such that the lower side of the body contacts the joist, and such that the pair of alignment members are oriented on a first side of the joist and a second side of the joist; placing the U-shaped board engagement member into contact with a board oriented on an upper side of the joist; placing a threaded fastener into the aperture of the first angled face; and applying a torque to the threaded fastener, causing the threaded fastener to engage the joist through the aperture and exert a force onto the first angled face, resulting into a force being applied through the board engagement member and into the board.

In another embodiment, a method for manipulating a board is provided, the method comprising: providing a device for manipulating a board, comprising: a body having an upper side and a lower side; the body having a proximal end comprising two angled faces, wherein a first angled face is formed on the upper side, wherein a second angled face is formed on the lower side, and wherein the first angled face and the second angled face each include an aperture extending in an inclined direction orthogonal to the angled face and through the body; the body having a distal end including a U-shaped board engagement member including a pair of legs; and the body having a pair of joist alignment members extending downwardly from the lower side; orienting the device upon a subfloor member, such that the upper side of the body contacts the subfloor member, and such that the pair of alignment members are oriented away from the subfloor member; placing the U-shaped board engagement member into contact with a board oriented on an upper side of the subfloor member; placing a threaded fastener into the aperture of the second angled face; and applying a torque to the threaded fastener, causing the threaded fastener to engage the subfloor member through the aperture and exert a force onto the second angled face, resulting into a force being applied through the board engagement member and into the board.

BRIEF DESCRIPTION OF THE DRAWINGS

The accompanying figures, which are incorporated in and constitute a part of the specification, illustrate various example embodiments, and are used merely to illustrate various example embodiments. In the figures, like elements bear like reference numerals.

DETAILED DESCRIPTION

Figure 1A:
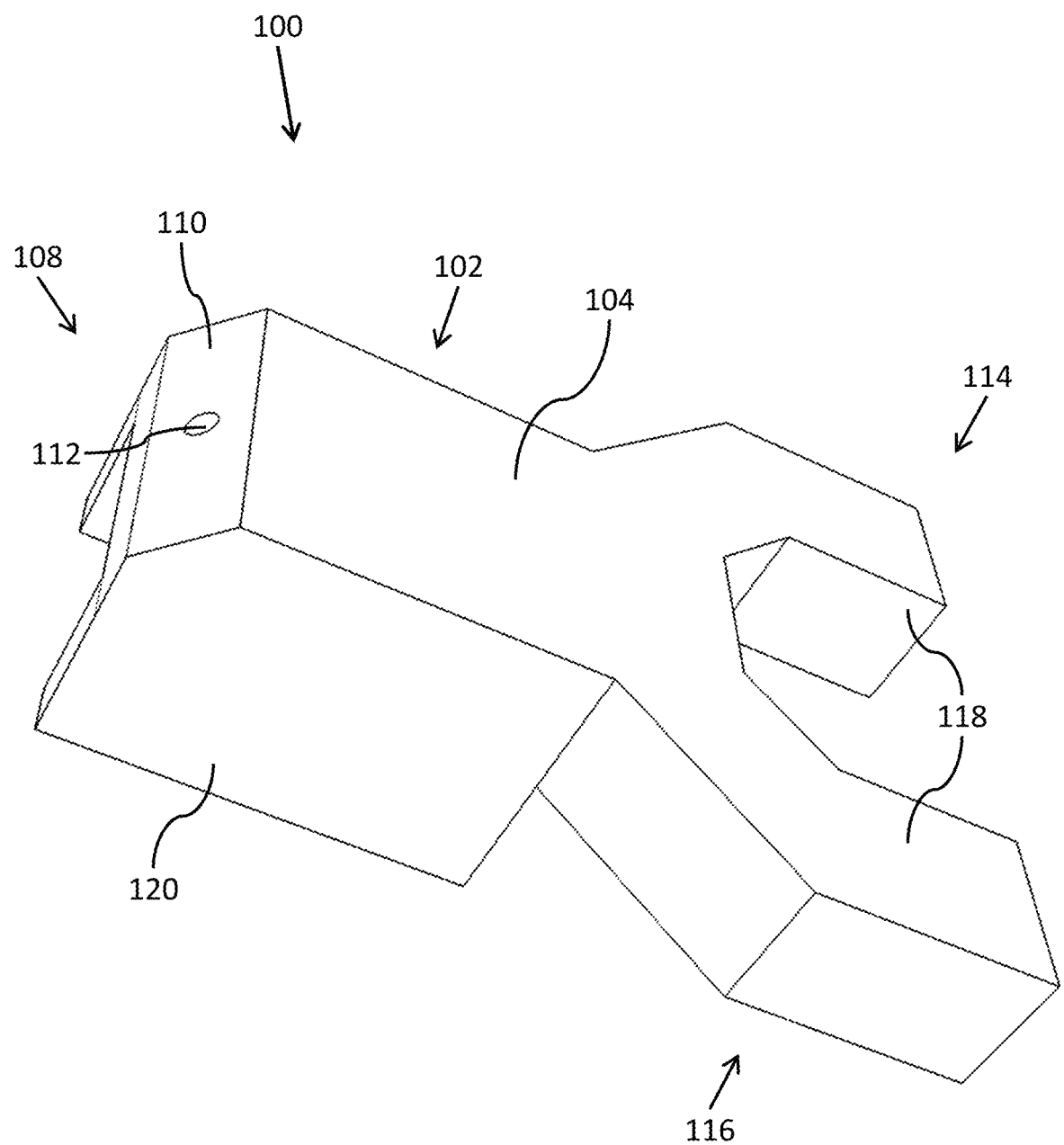
FIG. 1A illustrates an upper perspective view of a device 100 for manipulating a board.

FIGS. 1A-1F illustrate a device 100 for manipulating a board. Device 100 includes a body 102 having an upper side 104 and a lower side 106. Body 102 includes a proximal end 108 and a distal end 114.

Proximal end 108 may include an angled face 110 extending between its proximal-most face and its upper side 104. As illustrated in FIG. 1E, angled face 110 may be inclined at an angle FA. Angle FA may be exactly or about 45 degrees relative upper side 104.

Angled face 110 may include an aperture 112 extending completely through body 102, from angled face 110 to lower side 106. Aperture 112 may extend from angled face 110 through body 102 at an angle AA relative to angled face 110. Angle AA may be exactly or about 90 degrees relative to angled face 110. Aperture 112 may be substantially orthogonal to angled face 110. Aperture 112 may be orthogonal to angled face 110. Aperture 112 may be of a diameter to accept a threaded fastener extending therethrough, as described further below.

Upper side 104 may be substantially planar.

Body 102 may include at least one joist alignment member 120 extending downwardly from lower side 106. That is, at least one joist alignment member 120 extends from body 102 in a direction opposite upper side 104. Where device 100 includes two joist alignment members 120, a joist is oriented between the joist alignment members 120. As illustrated in FIG. 1D, body 102 may include a pair of joist alignment members 120 spaced apart a distance MW. Distance MW may be any of a variety of distances appropriate to allow device 100 to be oriented upon and engage with a joist. In one embodiment, joists are 1.50 inches in width, and distance MW is greater than 1.50 inches to allow device 100 to fit over an edge of the joist.

At distal end 114, device 100 includes a board engagement member 116. Board engagement member 116 may include at least one leg 118. Board engagement member 116 may be substantially U-shaped, including a pair of spaced apart legs 118. Board engagement member 116 may include at least one board engagement face 119 oriented at the distal-most end of each leg 118. Board engagement face 119 may engage and apply force to a board to be manipulated by device 100, such as for example board 232 in FIGS. 2A and 2B. Board engagement face 119 may be substantially planar. Board engagement face 119 may include any surface, shape, or size that is conducive to applying force to a board. For example, board engagement face 119 may include a profile that is substantially similar to the cross-section of device engagement face of a board. That is, if a board has a semicircular cross-section at its device engagement face, board engagement face 119 may include a profile having a similar shape, in negative, so as to create an even mating surface between board engagement face 119 and the device engagement face.

Figure 1B:
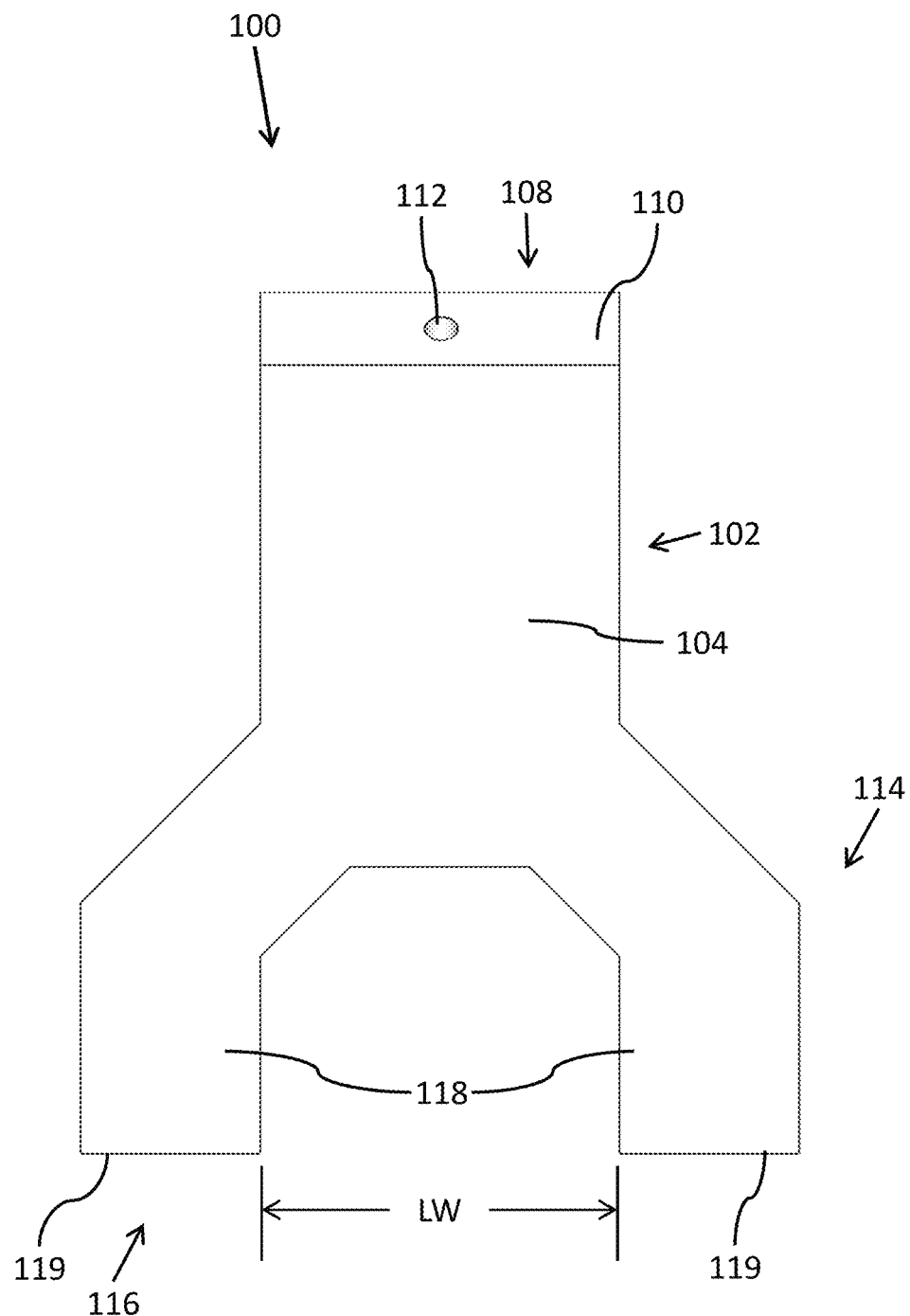
FIG. 1B illustrates an upper plan view of device 100 for manipulating a board.
Figure 1C:
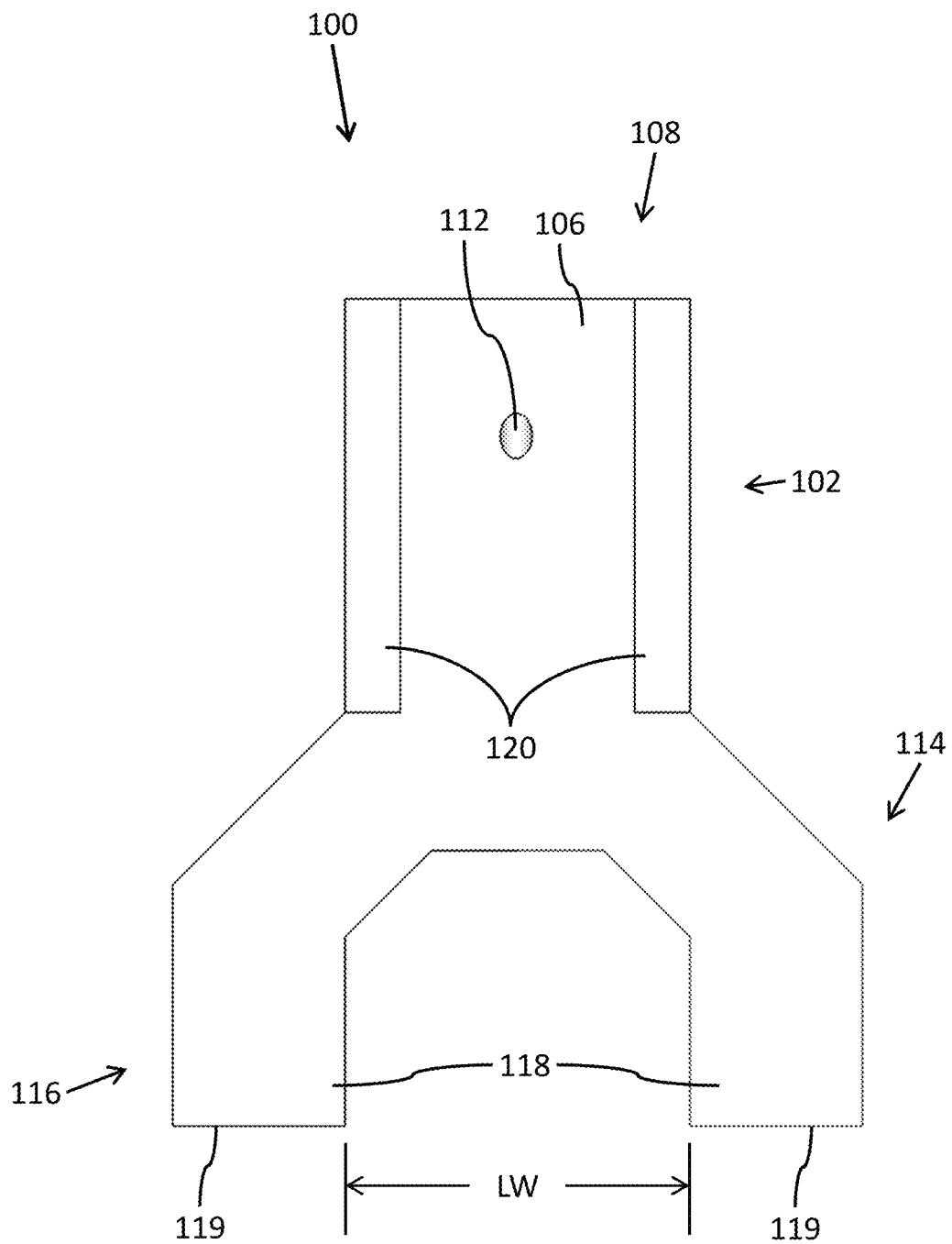
FIG. 1C illustrates a lower plan view of device 100 for manipulating a board.
Figure 1D:
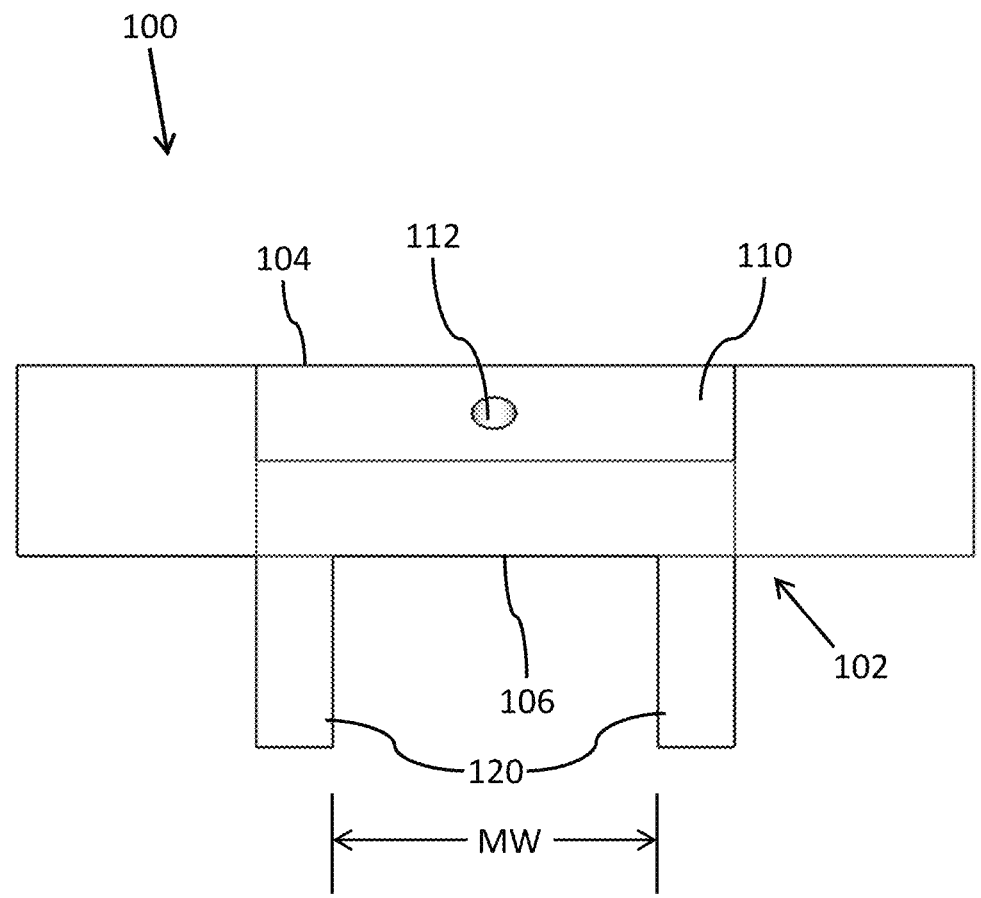
FIG. 1D illustrates a front elevational view of device 100 for manipulating a board.
Figure 1E:
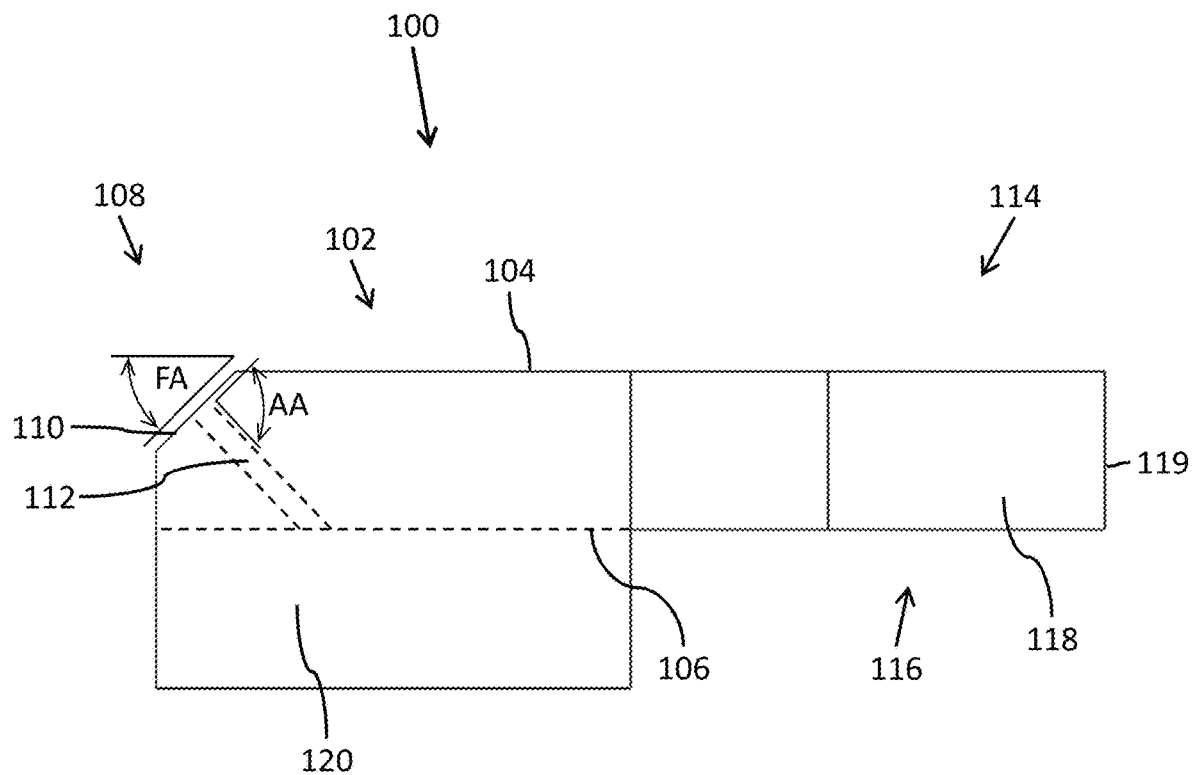
FIG. 1E illustrates a side elevational view of device 100 for manipulating a board.
Figure 1F:
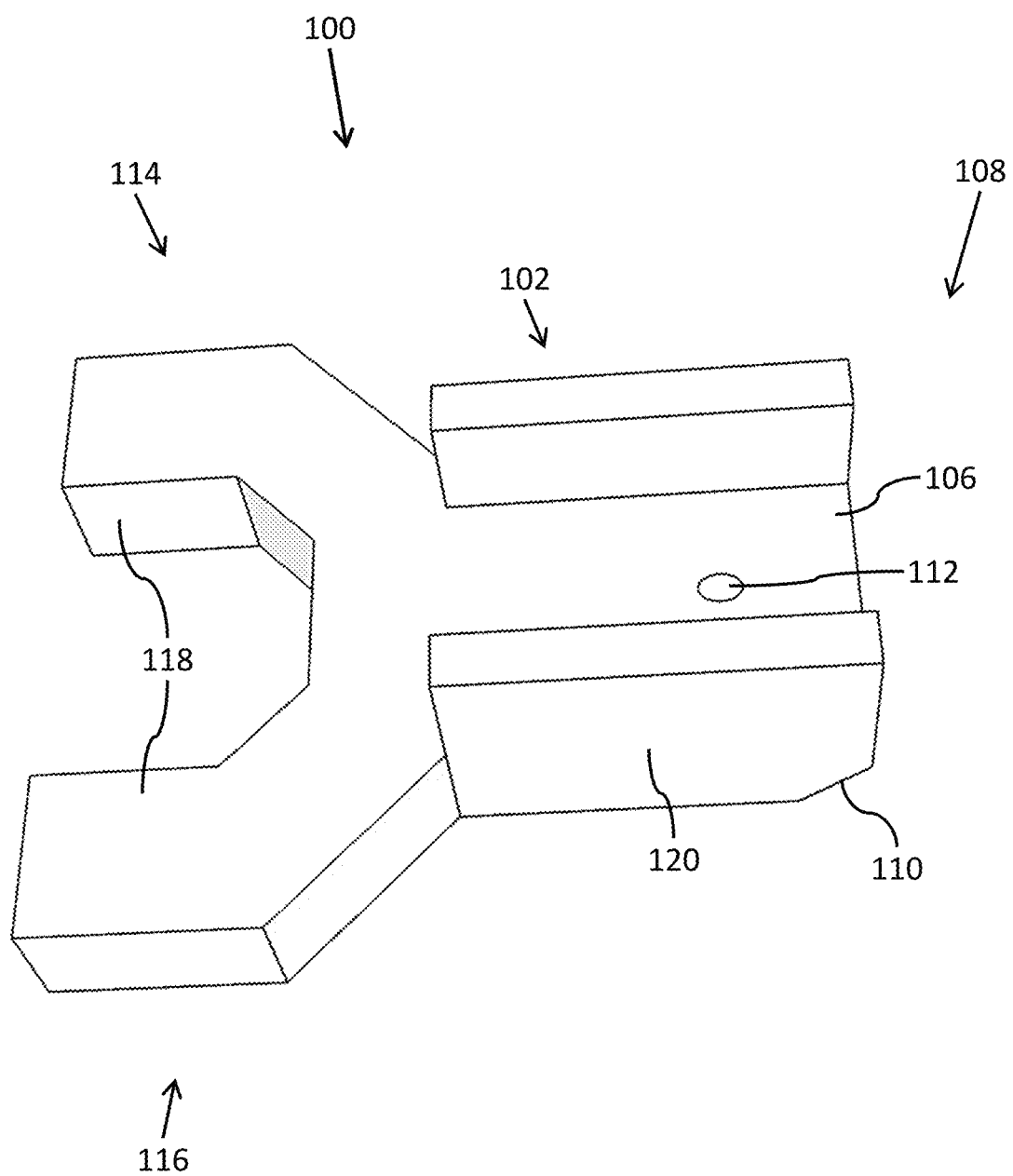
FIG. 1F illustrates a lower perspective view of device 100 for manipulating a board.

As illustrated in FIGS. 1B and 1C, legs 118 may be spaced apart a distance LW. Distance LW may be selected to allow a board fastener to be placed on a board to be manipulated in an area between legs 118, following the manipulation of board 232 into a desired position. The board to be manipulated may be for example board 232 in FIGS. 2A and 2B. Distance LW may also be selected so as to space legs 118 apart from one another to distribute the force applied by device 100 onto a board to be manipulated (such as board 232 for example) over a greater area and potentially avoid or mitigate damage to the board to be manipulated. Distance LW may be about 2.50 inches.

Figure 2A:
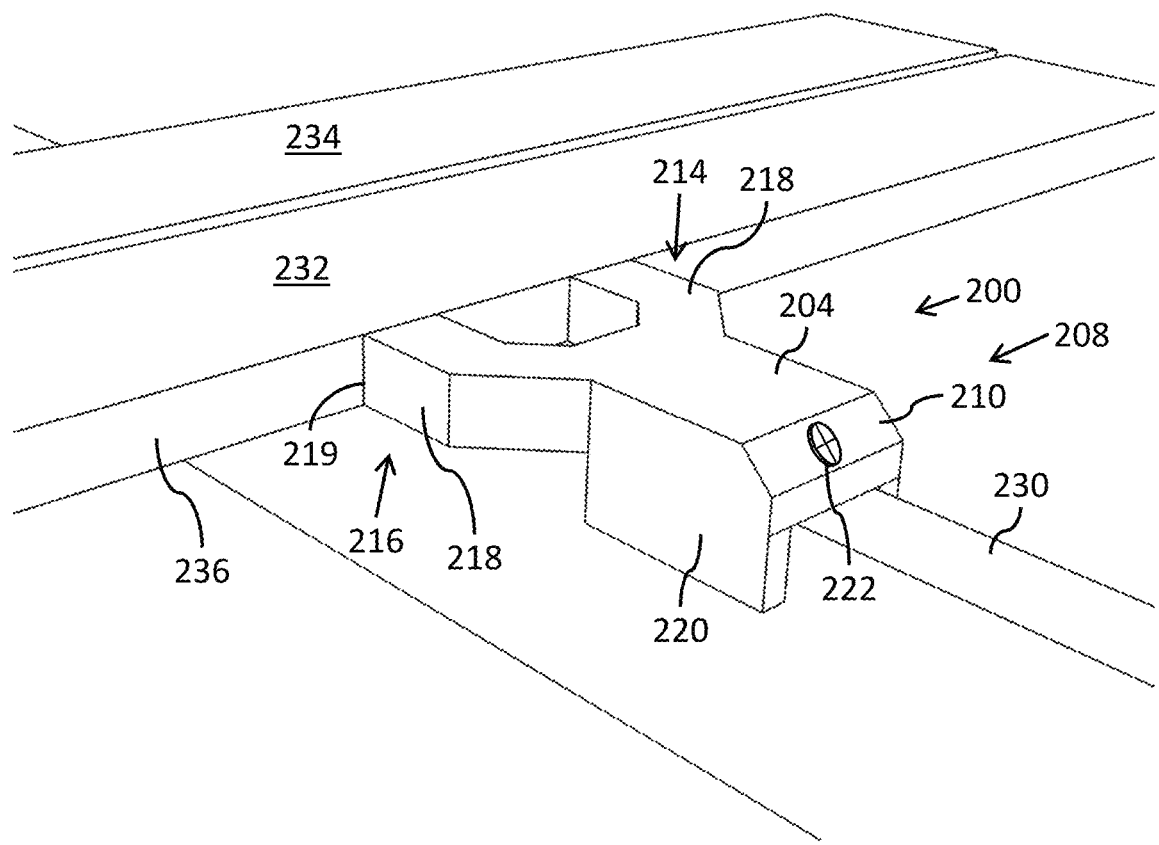
FIG. 2A illustrates an upper perspective view of a device 200 for manipulating a board engaging a joist 230 and engaging a board 232.
Figure 2B:
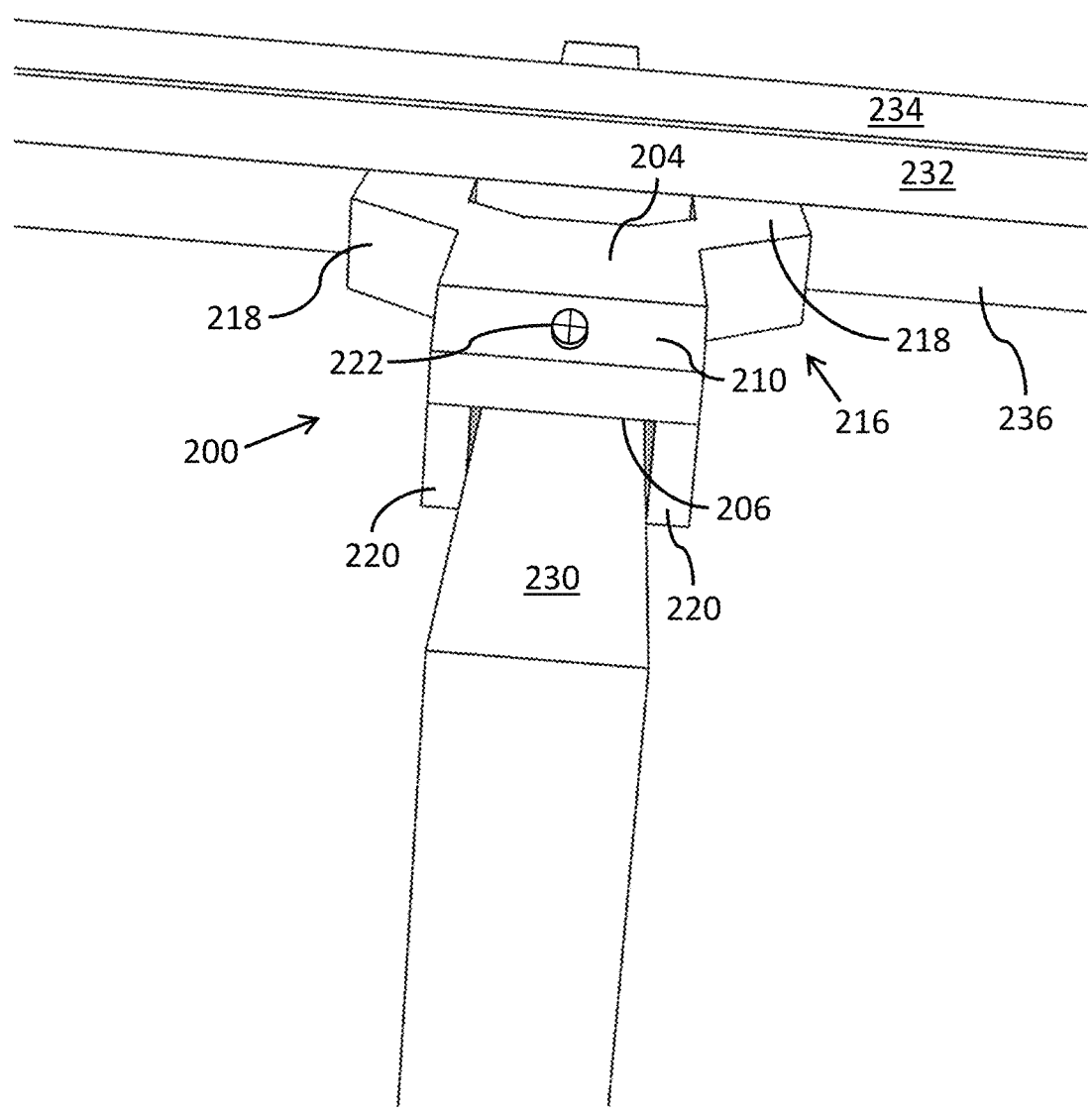
FIG. 2B illustrates a front perspective view of device 200 for manipulating a board engaging a joist 230 and engaging board 232.

FIGS. 2A and 2B illustrate a device 200 for manipulating a board engaging a joist 230 and engaging a board 232. Device 200 may include a body 202 having a proximal end 208 and a distal end 214. Body 202 may include an upper side 204 and a lower side 206. Body 202 may include an angled face 210 at its proximal end 208, the angled face 210 including an aperture (not shown) extending through body 202. Body 202 may include a pair of joist alignment members 220 extending downwardly from lower side 206. Body 202 may include a distal end 214 having a board engagement member 216. Board engagement member 216 may include a pair of spaced apart legs 218, each including a board engagement face 219.

Device 200 may be placed upon joist 230 such that lower side 206 rests upon an edge of the joist, and such that the pair of joist alignment members 220 are oriented on opposite sides of joist 230. Joist alignment members 220 may act to prevent device 200 from falling off of joist 230, while permitting device 200 to slide freely forward and backward longitudinally along joist 230.

Device 200 may include a threaded fastener 222 oriented in an aperture (not shown, but similar to aperture 112 discussed above) and extending through body 202. Threaded fastener 222 may include any of a variety of fasteners that are advanced longitudinally by one imparting rotational torque to the fastener. Threaded fastener 222 may include, without limitation, a screw, a lag bolt, a bolt, and the like. Threaded fastener may include a head configured to engage and apply a compressive force to device 200 normal to angled face 210. Threaded fastener 222 may engage at its distal end joist 230. For example, threaded fastener 222 may thread into joist 230. Threaded fastener 222 may be rotated and advanced longitudinally into joist 230 until threaded fastener 222 is placed in a state of tension, and applies a compressive force to device 200 normal to angled face 210.

The application of a compressive force upon angled face 210 may create a vertical force vector (directed toward lower side 206 and away from upper side 204) and a horizontal force vector (directed toward distal end 214 and away from proximal end 208). Accordingly, device 200 may experience a compressive force along its length originating at angled face 210, into legs 218 and board engagement faces 219, and which may apply a compressive force into a board engagement face 236 of manipulated board 232.

Manipulated board 232 may be a board or other structural member that a user of device 200 wishes to bend or otherwise manipulate into a desired position. For example, a user of device 200 may wish to provide a lateral force to a crooked (in the technical sense of that term in lumber terminology) board to manipulate the board into a desired position. Once manipulated board 232 is in the desired position, a user may apply one or more board fastener (not shown) to manipulated board 232 at any desired point on manipulated board 232, including for example between legs 218. The board fastener may be applied to manipulated board 232 on board engagement face 236.

A fixed board 234 may be oriented adjacent to manipulated board 232, and manipulated board 232 may be manipulated into a desired position relative to fixed board 234. For example, a user may desire to place manipulated board 232 into direct contact with fixed board 234. Alternatively, a user may desire to place manipulated board 232 into a spaced orientation relative to fixed board 234.

Figure 3:
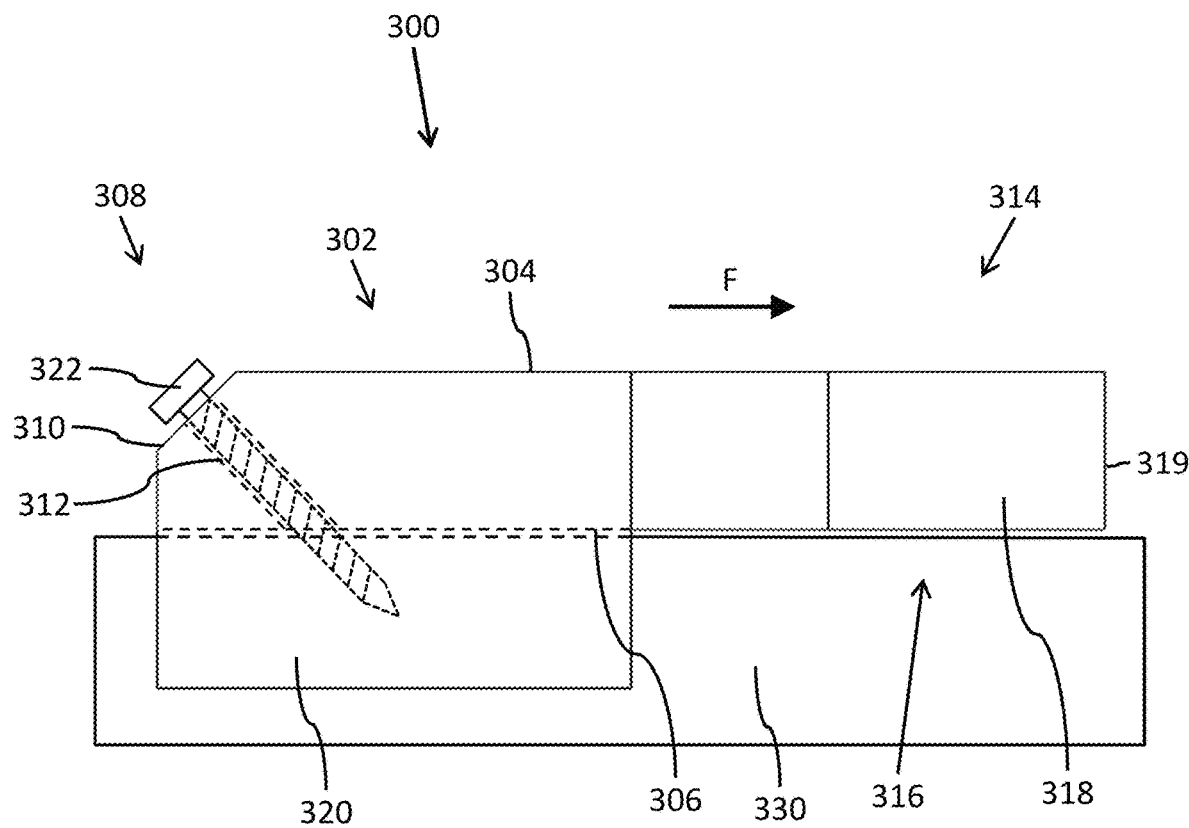
FIG. 3 illustrates a side elevational view of a device 300 for manipulating a board engaging a joist 330.

FIG. 3 illustrates a device 300 for manipulating a board engaging a joist 330. Device 300 may include a body 302 having a proximal end 308 and a distal end 314. Body 302 may include an upper side 304 and a lower side 306. Body 302 may include an angled face 310 at its proximal end 308, the angled face 310 including an aperture 312 extending through body 302. Body 302 may include at least one joist alignment member 320 extending downwardly from lower side 306. Body 302 may include a distal end 314 having a board engagement member 316. Board engagement member 316 may include at least one leg 318, each including a board engagement face 319.

A threaded fastener 322 may extend through aperture 312 and into joist 330, and a rotational torque may be applied to the threaded fastener. As discussed above, threaded fastener 322 may be extended into device 300 until the proximal head of threaded fastener 322 engages and applies a compressive force upon angled face 310 and threaded fastener 322 is placed in a state of tension. Threaded fastener 322 engages joist 330, such as by example threading into joist 330.

The compressive force applied to angled face 310 includes a horizontal component illustrated as force F. Force F is a compressive force that extends longitudinally along device 300 away from proximal end 308 and toward distal end 314. Force F extends through board engagement member 316, at least one leg 318, and into board engagement face 319. Force F passes through board engagement face 319 and into a device engagement face (such as 236) of a manipulated board (such as 232).

As illustrated, lower side 306 engages and rests upon an upper side of joist 330.

Figure 4A:
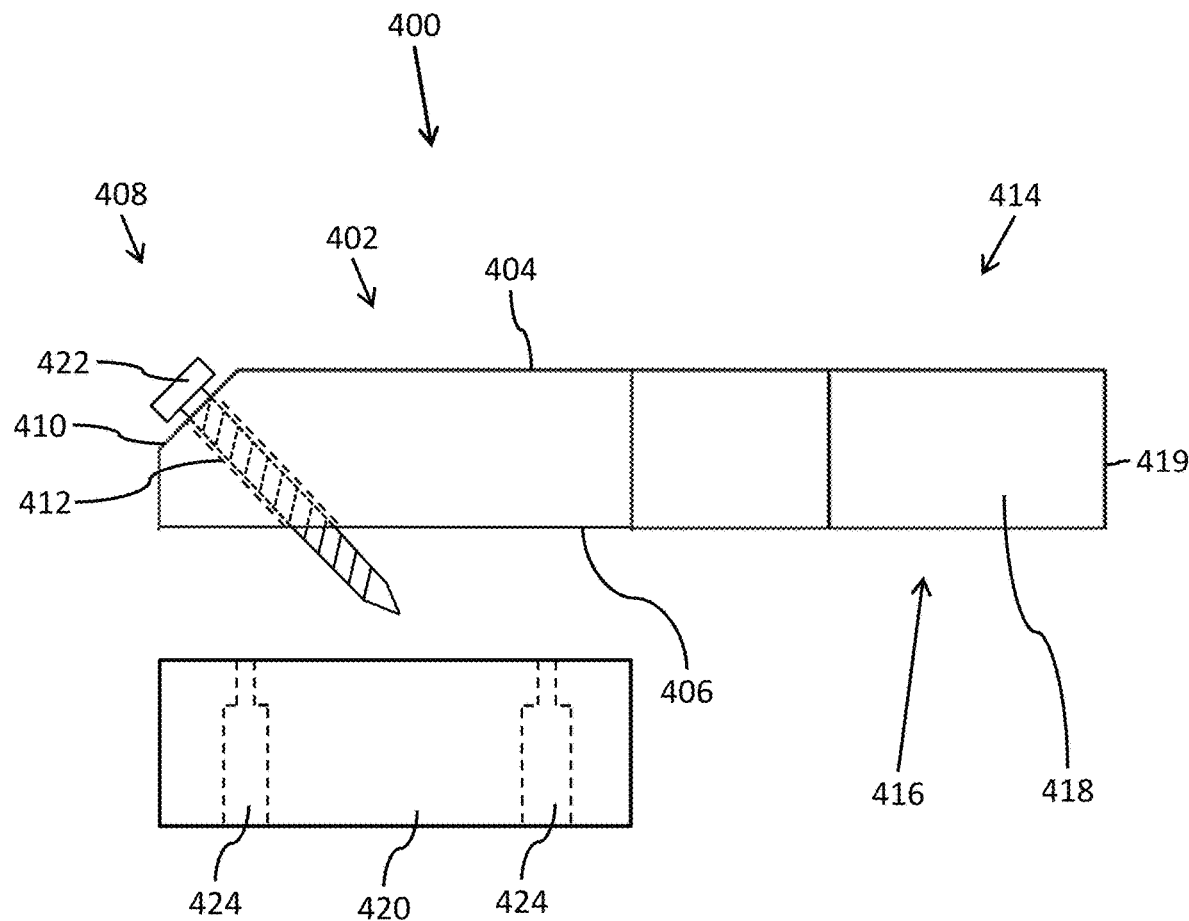
FIG. 4A illustrates a side elevational view of a device 400 for manipulating a board with removable joist alignment members in a removed state.
Figure 4B:
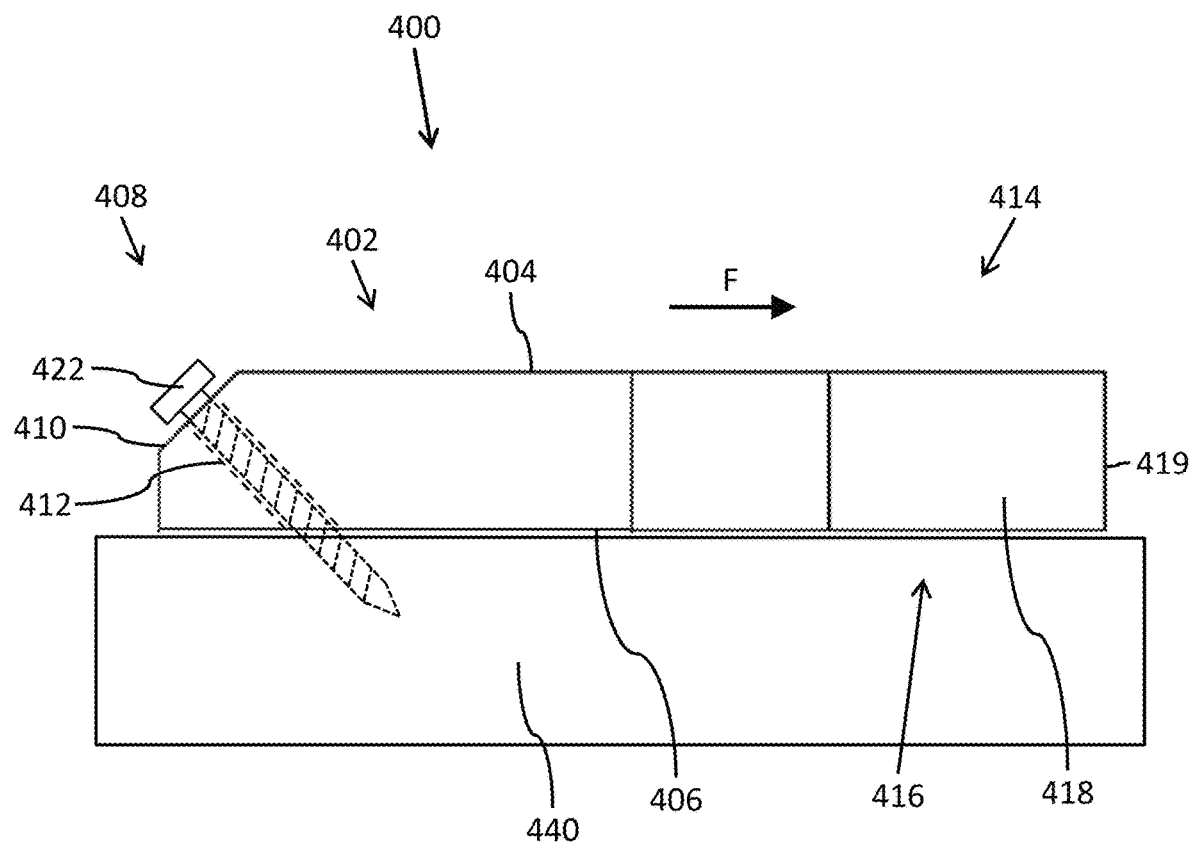
FIG. 4B illustrates a side elevational view of a device 400 for manipulating a board with removable joist alignment members in a removed state, device 400 engaging a base member 440.

FIGS. 4A and 4B illustrate a device 400 for manipulating a board with removable joist alignment members 420. Device 400 may include a body 402 having a proximal end 408 and a distal end 414. Body 402 may include an upper side 404 and a lower side 406. Body 402 may include an angled face 410 at its proximal end 408, the angled face 410 including an aperture 412 extending through body 402. Body 402 may include at least one joist alignment member 420 extending downwardly from lower side 406. Body 402 may include a distal end 414 having a board engagement member 416. Board engagement member 416 may include at least one leg 418, each including a board engagement face 419. A threaded fastener 422 may be oriented within aperture 412.

As illustrated, at least one joist alignment member 420 may be selectively removable by a user. Joist alignment member 420 may include at least one fastener access channel 424 through which a user may access and install or remove fasteners (not shown) to affix joist alignment member 420 to lower side 406 of body 402.

As illustrated in FIG. 4B, device 400 may be placed upon and engaged within a base member 440. Base member 440 may be a planar element that extends laterally beyond the sides of device 400, rather than the relatively thin joists 230/330 illustrated in FIGS. 2A, 2B, and 3 and described above. Due to the dimensions of base member 440, joist alignment members 420 must be removed from device 400 to permit lower side 406 to mate with an upper side of base member 440. Base member 440 may be, without limitation, a subfloor contained within a building and upon which a plank/board floor may be laid.

Threaded fastener 422 may engage base member 440, for example, by threading into base member 440 by the application of a torque to threaded fastener 422. Threaded fastener 422 may be tightened until it exerts a compressive force on angled face 410, and threaded fastener 422 is placed into a state of tension. A horizontal component of the compressive force exerted on angled face 410 is directed longitudinally along device 400, and is illustrated as force F. Force F passes through a manipulated board as described above.

Figure 5:
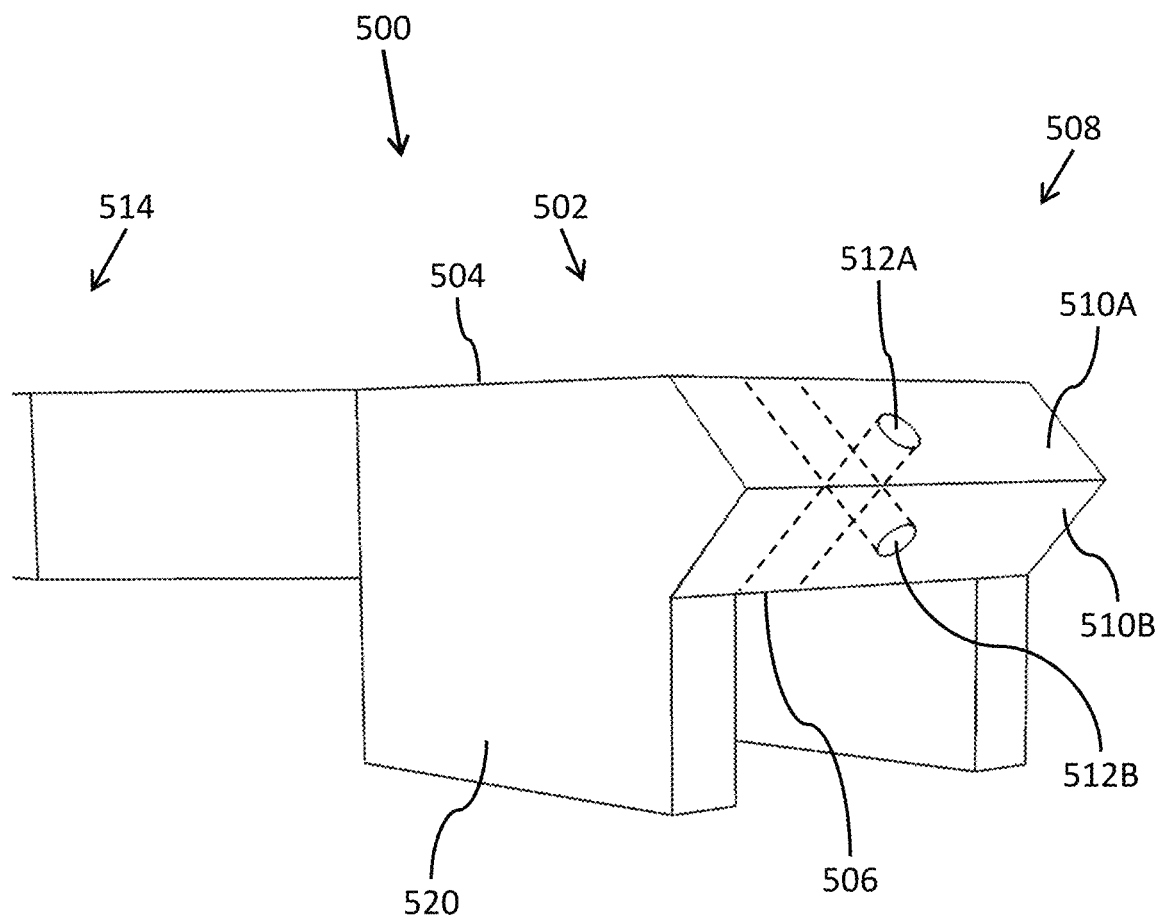
FIG. 5 illustrates a partial side perspective view of a device 500 for manipulating a board.

FIG. 5 illustrates a device 500 for manipulating a board. Device 500 may include a body 502 having a proximal end 508 and a distal end 514. Body 502 may include an upper side 504 and a lower side 506. Body 502 may include a first angled face 510A and a second angled face 510B at its proximal end 508, the angled faces 510A, 510B including a first aperture 512A and a second aperture 512B, respectively, extending through body 502. Body 502 may include at least one joist alignment member 520 extending downwardly from lower side 506. Body 502 may include a distal end 514 having a board engagement member (not shown). The board engagement member may include at least one leg (not shown), each including a board engagement face (not shown). A threaded fastener (not shown) may be oriented within apertures 512A and/or 512B.

First and second angled faces 510A, 510B may each be substantially planar. Angled faces 510A, 510B may be oriented about 90 degrees relative to one another. First angled face 510A may be inclined about 45 degrees relative to upper side 504. Second angled face 510B may be inclined about 45 degrees relative to lower side 506. First angled face 510A may include a first aperture 512A extending from first angled face 510A to lower side 506. Second angled face 510B may include a second aperture 512B extending from second angled face 510B to upper side 504. Each aperture 512A, 512B may extend substantially orthogonally into its respective angled face 510A, 510B. First aperture 512A may be oriented about 90 degrees relative to second aperture 512B. First aperture 512A may intersect second aperture 512B.

At least one joist alignment member 520 may be removable as illustrated in FIGS. 4A and 4B, or fixed as illustrated in FIGS. 1A-1F.

Figure 6:
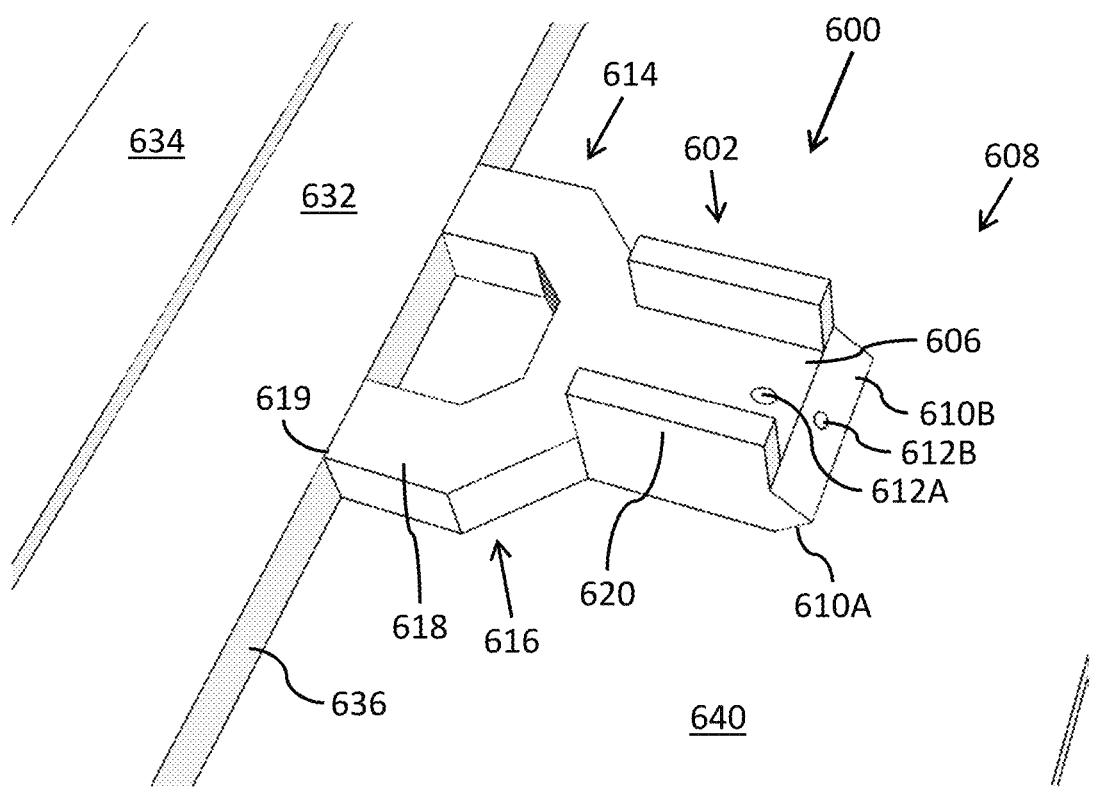
FIG. 6 illustrates an upper perspective view of a device 600 for manipulating a board engaging a base member 640 and engaging a board 632.

FIG. 6 illustrates a device 600 for manipulating a board engaging a base member 640 and engaging a board 632. Device 600 may include a body 602 having a proximal end 608 and a distal end 614. Body 602 may include an upper side 604 and a lower side 606. Body 602 may include a first angled face 610A and a second angled face 610B at its proximal end 608, the angled faces 610A, 610B including a first aperture 612A and a second aperture 612B, respectively, extending through body 602. Body 602 may include at least one joist alignment member 620 extending from lower side 606. Body 602 may include a distal end 614 having a board engagement member 616. Board engagement member 616 may include at least one leg 618, each including a board engagement face 619. A threaded fastener (not shown) may be oriented within apertures 612A and/or 612B.

A threaded fastener (not shown) may extend through one of apertures 612A or 612B, and into base member 640. As illustrated in FIG. 4B, base member 640 may be a planar element that extends laterally beyond the sides of device 600, rather than the relatively thin joists 230/330 illustrated in FIGS. 2A, 2B, and 3 and described above. Due to the dimensions of base member 640, joist alignment members 620 cannot be oriented downwardly as lower side 606 will not be able to mate with an upper side of base member 640. As such, device 600 may be inverted when used with such a base member 640, which may include, without limitation, a subfloor contained within a building and upon which a plank/board floor may be laid. Where device 600 is used in an inverted orientation, an upper side (not shown) is mated with base member 640, second angled face 610B is oriented upwardly, and second aperture 612B receives a threaded fastener (not shown) that extends through body 602 and into base member 640.

A horizontal component of the compressive force applied to second angled face 610B by a threaded fastener extends longitudinally along the length of device 600, and into device engagement face 636 of manipulated board 632, which results in the controlled bending or otherwise manipulation of board 632. Board 632 may be manipulated into a desired position, which may be relative to the position of a fixed board 634.

Device 600 may likewise be used with a joist instead of base member 640, by simply reverting device 600 so that lower surface 606 is oriented downwardly and mates with a joist, and joist alignment members 620 are oriented on either side of the joist. In such an arrangement, first angled face 610A is oriented upwardly, and first aperture 612A receives a threaded fastener (not shown) that extends through body 602 and into the joist.

In this manner, device 600 may be applied to either of a joist, or any planar base member such as a subfloor, without having to remove joist alignment members 620, but rather through simply inverting device 600.

Any of devices 100, 200, 300, 400, 500, and 600 may be made of any of a variety of materials, including, without limitation, a metal including an alloy, a polymer, a wood material, a composite, and the like. Any of various individual components of devices 100, 200, 300, 400, 500, and 600 may be made of any of a variety of materials, which may be different from other components thereof.

Any of devices 100, 200, 300, 400, 500, and 600 may be used to manipulate boards into place, including for example deck boards or flooring boards.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See Bryan A. Garner, A Dictionary of Modern Legal Usage 624 (2d. Ed. 1995). Also, to the extent that the terms "in" or "into" are used in the specification or the claims, it is intended to additionally mean "on" or "onto." To the extent that the term "substantially" is used in the specification or the claims, it is intended to take into consideration the degree of precision reasonably available in the relevant manufacturing. To the extent that the term "selectively" is used in the specification or the claims, it is intended to refer to a condition of a component wherein a user of the apparatus may activate or deactivate the feature or function of the component as is necessary or desired in use of the apparatus. To the extent that the term "operatively connected" is used in the specification or the claims, it is intended to mean that the identified components are connected in a way to perform a designated function. As used in the specification and the claims, the singular forms "a," "an," and "the" include the plural. Finally, where the term "about" is used in conjunction with a number, it is intended to include ±10% of the number. In other words, "about 10" may mean from 9 to 11.

As stated above, while the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art, having the benefit of the present application. Therefore, the application, in its broader aspects, is not limited to the specific details, illustrative examples shown, or any apparatus referred to. Departures may be made from such details, examples, and apparatuses without departing from the spirit or scope of the general inventive concept.

What is claimed is:

1. A device for manipulating a board, comprising:
a body having an upper side and a lower side;
the body having a proximal end comprising an angled face,
    wherein the angled face is formed on the upper side, and
    wherein the angled face includes an aperture extending into the angled face, completely through the body, and out of the lower side;
the body having a distal end including a U-shaped board engagement member including a pair of legs; and
the body having at least one joist alignment member extending downwardly from the lower side.

2. The device of claim 1, wherein the aperture extends orthogonally into the angled face.

3. The device of claim 1, wherein the body has two joist alignment members extending downwardly from the lower side.

4. The device of claim 1, wherein the at least one joist alignment member is removable.

5. The device of claim 1, wherein the angled face is inclined at an angle of 45 degrees relative to the upper side of the body.

6. The device of claim 1, further comprising a joist oriented in direct contact with the lower side, and further comprising a threaded fastener extending through the aperture, completely through the body, out of the lower side, and into the joist.

7. The device of claim 3, further comprising a joist oriented in direct contact with the lower side, wherein the two joist alignment members orient the device upon a joist, such that the two joist alignment members are oriented on a first side of the joist and a second side of the joist.

* * * * *